FLUID CONNECTOR UNITS

Filed Aug. 6, 1965 3 Sheets-Sheet 1

INVENTOR.
FRANCIS XAVIER KAY
BY
Kurt Kelman
AGENT

INVENTOR.

FRANCIS XAVIER KAY

BY

Kurt Kelman

AGENT

July 9, 1968 F. X. KAY 3,391,703

FLUID CONNECTOR UNITS

Filed Aug. 6, 1965 3 Sheets-Sheet 3

INVENTOR.
FRANCIS XAVIER KAY
BY
Kurt Kelman
AGENT

United States Patent Office 3,391,703
Patented July 9, 1968

3,391,703
FLUID CONNECTOR UNITS

Francis X. Kay, Horley, Surrey, England, assignor to Applied Controls Limited, London, England, a British company Filed Aug. 6, 1965, Ser. No. 477,676
Claims priority, application Great Britain, Aug. 6, 1964, 32,059/64
6 Claims. (Cl. 137—269)

ABSTRACT OF THE DISCLOSURE

A mounting block superposed on a manifold block and carrying fluid-actuated components having fluid communication through bores in the mounting block with bores in the manifold block. Transverse holes extend from the mounting block bores to one side of the mounting block which is covered by one or more circuit plates, the circuit plates having channels which connect together selected holes according to predetermined circuitry. The circuitry may be changed by changing the circuit plates, without removing the components from the mounting block or disturbing fluid connections to the manifold block.

This invention relates to a connector unit for interconnecting fluid circuits such as liquid or pneumatic control circuits. The connector unit of the invention is particularly well-suited, although not exclusively, for enabling components such as pneumatic circuit isolating devices, pneumatic valves, and other pneumatically operated devices, hereinafter referred to generically as components, to be interconnected with one another as desired.

In accordance with the present invention a connector unit comprises a mounting block having fluid-pressure operated components mounted on one face, linear through passages extending through the block from beneath the components and conveying working fluid to and from the components, holes extending linearly into the block from a flat side-face thereof and opening at their inner ends into the passages, a circuit plate clamped to the side-face and formed with a pattern of channels inter-connecting selected holes for fluid flow therebetween under predetermined circuitry, and a gasket covering the channelled surface of the plate to confine the fluid flow to the channels.

The circuit plate may be held against the side-face of the mounting block by bolts and, as a separate entity, may be changed without moving the components or pipe connections leading to the connector unit. In some cases it is necessary to provide channels which cross over one another and in the case two or more circuit plates separated by a gasket may be clamped together to one side of the block. Alternatively the circuit plates may be clamped to different side-faces of the block and appropriate transverse holes made through the block where necessary to provide the necessary communication between the passages and the channels.

Preferably a thin gasket is provided between the grooved or channelled surface of the circuit plate and the face to which the plate is to be clamped, although O-rings may be provided instead. The gasket may be provided between one side-face of the mounting block and the circuit plate and also between pairs of plates when clamped together to form a stack, such gaskets being suitably made of oil impregnated fibrous material or cork and having a thickness of approximately .020. Alternatively a rubbery or plastics sheet may be used for the gasket. The gasket must be capable of providing a seal against the channelled surface of the circuit plate and should be capable of being deformed slightly into the channels formed in the plate to enable the corner edges of the channels to bite into the gasket and form a good line seal therewith.

The grooves or channels are preferably formed on the plate by recessing parts of a diagram printed or otherwise marked on the face of the plate. The grooves may be formed by milling and in this case are suitably $1/16$ inch square in cross-section. The diagram may alternatively be recessed where desired by an etching process and may be formed on the plate by a photographic printing process such as is used for manufacturing printed circuits. The positions of the holes in the block preferably lie on straight parallel lines and the parts of the surface of the plate which lie opposite the ends of the holes when the plate is clamped to the block are suitably marked. Different hole positions may be arranged to suit different components which can be fitted to the block, and appropriate channels to interconnect the components may then be formed on the circuit plate prior to fixing it to the block. Naturally only those parts of the diagram formed on the plate which are required to interlink components on the block are recessed. In some cases the channels may extend wholly through the circuit plate so that they appear as slots in it. With such an arrangement it is necessary to flank both sides of the plate with gaskets to confine the fluid to the slots. Throughout this specification and claims the term "channel" is to be understood as covering such an arrangement where the channels take the form of slots, as well as the arrangement where the channels extend only partly through the circuit plate.

In carrying out the invention the circuit plates may be clamped to one or more faces of the mounting block.

The invention will now be described in more detail, by way of examples, with reference to the accompanying partly diagrammatic drawings, in which.

Figures 1, 2:
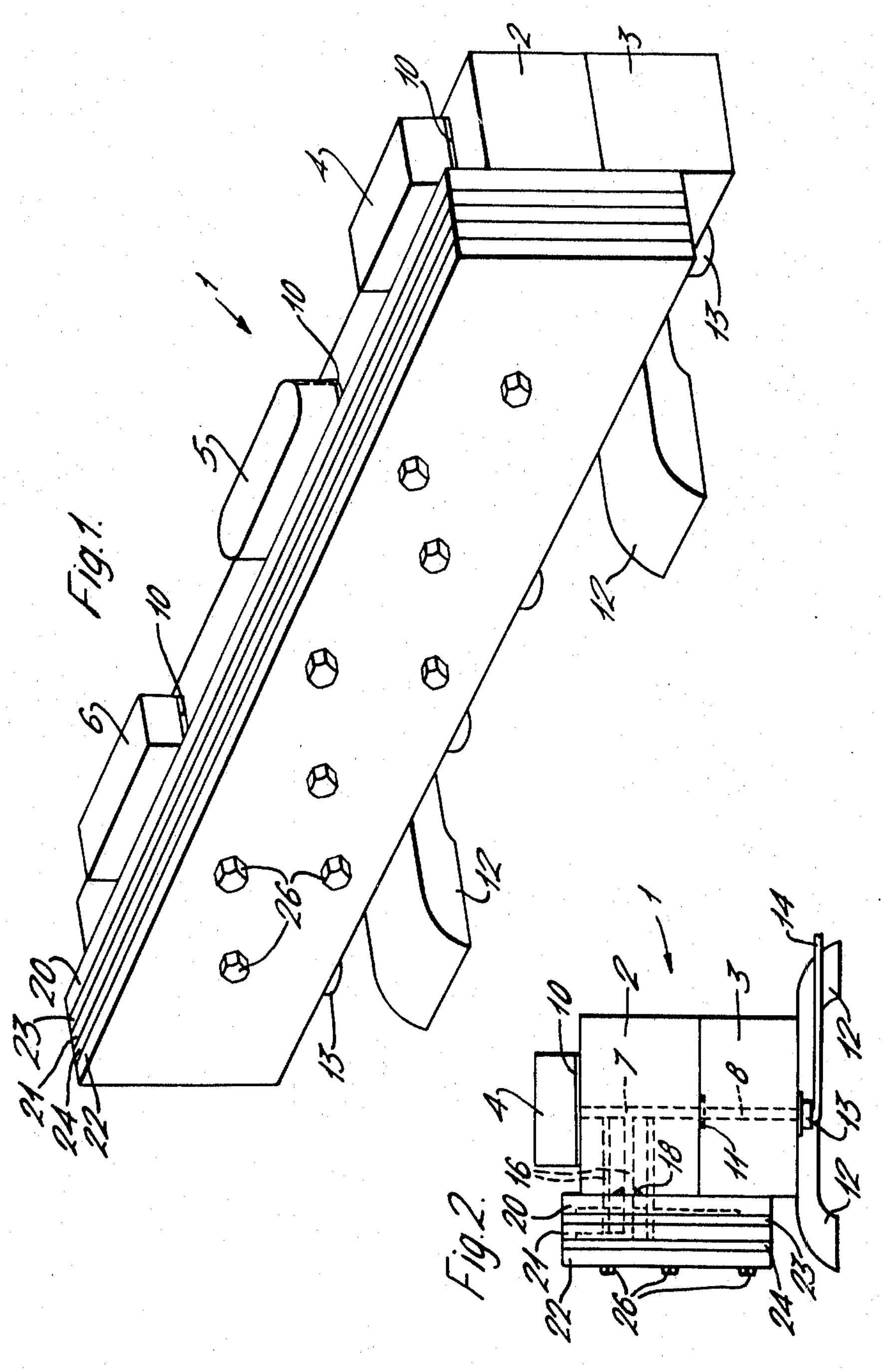
FIGURE 1 is a perspective view of a connector unit embodying the present invention.
FIGURE 2 is an end view of the connector unit of FIGURE 1.
Figure 3:
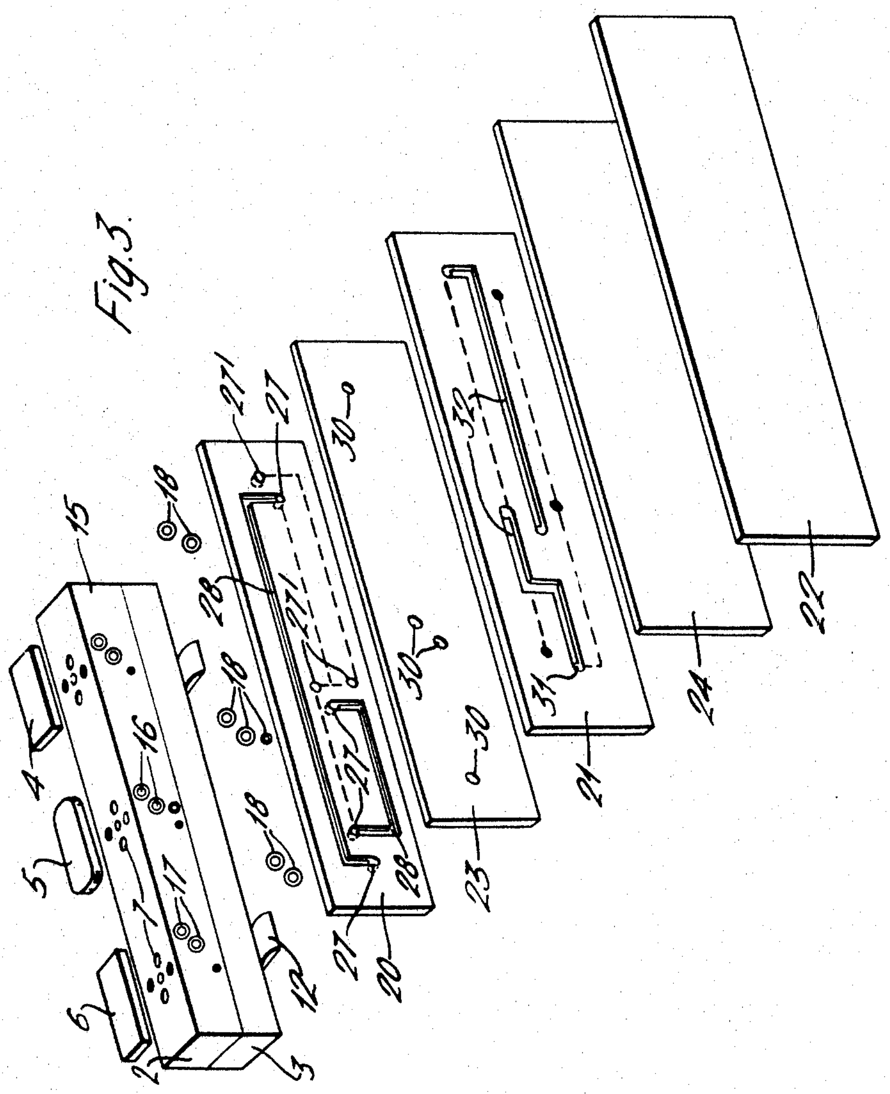
FIGURE 3 is an exploded view of the connector unit of FIGURE 1.

Referring jointly to FIGURES 1, 2 and 3 a connector unit 1 comprises a mounting block 2 made of aluminium and clamped by bolts (not shown) to the top surface of a manifold block 3. The mounting block 2 has bolted to its top surface three components 4, 5 and 6 which may comprise pneumatically operated control valves the control of each of which is dependent on one or both of the other components. Naturally the components may be operatively controlled by any form of pressure fluid, hydraulic or pneumatic, and the word "fluid" as used in this specification is intended to cover both possibilities. Although only three components are illustrated for the sake of simplicity, it is to be understood that more than three may be used.

The mounting block is penetrated by upright passages 7 which extend downwardly from beneath the components and some of which extend wholly through the block 2 and register with respective upright bores 8 formed in the manifold block 3. The passage 7 and bores 8 convey pneumatic fluid to and from each of the components and gaskets 10 are provided between the components and the mounting block 2 to prevent leakage of pneumatic fluid. The top ends of the bores 8 are countersunk to provide frusto-conical recesses each of which contains a resiliently deformable O-ring 11 which is compressed between the two blocks and forms a fluid tight seal around the junction of the bore 8 and passage 7.

The manifold block 3 rests on feet 12 and is provided in its underside with couplings 13 allowing piping 14 to be connected in fluid-tight manner to the bores 8.

The two blocks 2, 3 each have one side face 15 machined flat and co-planar. The mounting block 2 is provided with a number of holes 16 extending from the face 15 into the block and opening into respective passages 7. The outer ends of the holes 16 are countersunk at 17 to provide frusto-conical recesses individually receiving resiliently deformable O-rings 18 serving as sealing means around the open ends of the holes 16.

Clamped to the coplanar faces of the two blocks 2, 3 are three plates 20, 21 and 22, and two gaskets 23, 24 sandwiched between the plates. The two plates 20, 21 comprise circuit plates whereas the outermost plate 22 is a cover plate. The plates 20, 21 and 22 and the two gaskets 23, 24 are provided with bolt holes (not shown) which register with threaded bores (not shown) in the manifold block 3 and mounting block 2 and which receive headed bolts 26 for clamping the stack of plates and gaskets rigidly to the coplanar flat faces of the two blocks 2, 3.

The inner circuit plate 20 is formed with apertures 27 positioned to register with the open ends of the holes 16 and of the same diameter. When the plate 20 is clamped against the flat faces of the blocks the marginal surface of the inner surface of the plate around each aperture 27 compresses the O-ring 18 into its recess 17 so that a fluid-tight seal is made around the junction. The outer surface of the plate 20 is flat and is formed with a number of channels 28 of rectangular cross-section interlinking some of the apertures 27. It will be noticed that the channels or grooves 28 enable selected holes 16 associated with different components to communicate with one another.

Some of the apertures 27 are not linked by channels 28 and it will be seen that these apertures 27′ register with some of a number of openings 30 formed in the gasket 23. The gasket is made of rubbery material capable of forming a satisfactory seal against the channelled face of the circuit plate 20 when the connector unit is assembled. The remainder of the openings 30 register with some of the apertures 27.

The second circuit plate 21 is penetrated by apertures 31 which register with the openings 30 formed in the gasket 23. These apertures 31 are interlinked on the outer flat surface of the plate by a pattern of channels or grooves 32 of rectangular cross-section cut or etched in its surface. These channels 32 serve the same function as the channels 28 on the plate 20 and are used to provide communication between holes 16 which are difficult to interconnect by channels 28 on the plate 20 either because the channel pattern on the plate 20 would be too complex to be easily manufactured or because channels required to be isolated from one another would cross.

The second gasket 24 is similar to the first gasket 21 except that it is not provided with holes 30 but only with bolt holes. The outer or cover plate 22 is flat and rigid and its inner face is machined flat so that the pressure of the clamping bolts 26 is distributed evenly over the areas of the two gaskets 23, 24 and circuit plates 20, 21.

When the connector unit is assembled the desired fluid pressure circuits between the components 4, 5 and 6 are made by way of channels 28 and 32 in the two circuit plates. These channels can be easily made and easily cleaned by simply dismantling the stack of gaskets and circuit plates. Further, different fluid circuits between the same components can be simply made by changing one or both circuit plates 20, 21.

The circuit plates may be made of aluminium and the different logics each circuit plate is capable of providing may be photographically printed on its flat surface and the channels cut along the printed lines according to the particular logic desired.

In a similar manner the positions of the passages 7 and the holes 8 and 16 may be photographically printed or etched on the sides of the two blocks 2 and 3. Thus only those holes required for a specific component it is desired to mount on the connector unit need be drilled out.

It will be appreciated that the connector unit of the invention is exceedingly versatile and avoids the need for individual pipe connections to be made between separate components.

A further advantage of the connector described is that the number of parallel channels which can be accommodated on the circuit plates is limited only by their height and this can be as great as desired as it is not limited by the heights of the flat faces of the blocks.

It will be understood that in some cases the channels or grooves can be cut wholly through the thickness of the circuit plates with very little modification of the connector unit. One modification which is necessary in this case is to replace the O-ring seals 18 by a gasket such as gasket 24 but provided with holes at the positions of the O-rings. The gaskets must be capable of effectively sealing from one another two crossing channels formed, respectively, on different circuit plates.

Figure 4:
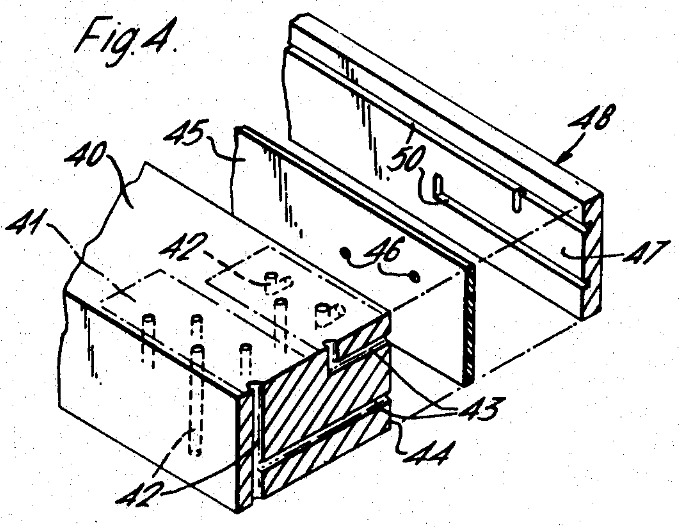
FIGURE 4 is an exploded view partly in section, of parts of a mounting block gasket and circuit plate used in another embodiment of connector unit.

FIGURE 4 shows parts of a modified connector unit utilizing a combined cover plate and circuit plate. In FIGURE 4 a mounting block 40 for mounting components at outlined positions 41 is penetrated beneath the positions of the components by upright passages 42. Some of these lead wholly through the block 40 while others do not. All of the "blind" passages and at least some of the "through" passages, are provided with transverse holes 43 which open through one flat face 44 of the block.

A gasket 45 normally lies against the flat face 44 of the block and is made from a rubbery fluid-impervious material capable of forming a good seal against the flat face 44. The gasket 45 is provided with holes 46 which register with the open ends of transverse holes 43, and is in turn covered by a flat channelled surface 47 formed on a combined cover and circuit plate 48. Bolts (not shown) pass through the plate 48 and gasket 45 and are screwed into threaded bores in the flat face 44 of the block 40 to clamp the gasket and plate firmly thereto.

The surface 47 of the plate 48 is provided with a number of channels 50 of rectangular cross-section which interlink selected holes 43 according to a predetermined logic. The corner edges of the channels 50 bite into the gasket 45 so that the different fluid-pressure circuits defined by the channels 50 are effectively isolated.

The advantage of the arrangement of FIGURE 4 over that of FIGURES 1 and 3 is that fewer parts are necessary and for simple circuits a cheaper connector unit can be manufactured. As in the previous example the different circuits capable of interconnection to perform different functions can be photographically printed or otherwise formed on the flat surface of the plate to indicate positions where channels are to be subsequently formed.

Although all of the examples of the invention shown in the drawings have circuit plates attached to only one face of the mounting block the invention is to be understood as covering arrangements where circuit plates are attached to more than one side-face of the block. Also, although the use of a separate manifold block is preferable, the invention also embraces the arrangement where the mounting block serves also as the manifold block.

In the examples described above the gaskets have been detachable from the circuits plates. However advances in technology have resulted in the development of gaskets formed by bonding a plastics layer to a metal surface. It will be appreciated that such gaskets are included within the scope of this invention where the metal surface can comprise either the channelled surface of the circuit plate or the flat face of the mounting block.

I claim:

1. A connector unit having a mounting block, straight passages formed in said block, components mounted on said block and communicating with one set of ends of said passages, a manifold block, bores formed in said manifold block coaxially arranged and communicating with respective passages in said mounting block, sealing means disposed between said two blocks around the junctions of said bores and said passages, a flat face formed on one side of said mounting block, a set of holes extending inwardly of said mounting block and communicating with respective passages, a stack of plates each having a flat surface of larger area than said flat face of the block, apertures formed in the plate adjacent said block and registering with respective holes in said block, O-ring sealing means compressed between said flat surface and said flat face the O-rings having their annuli registering with said holes and said apertures, gasket means disposed between said plates, means clamping the stack of plates to the face of the block, and channels formed on at least one of the said plates between the apertures formed therein.

2. A connector unit as set forth in claim 1, in which said gasket means comprise oil-impregnated cork laminae.

3. A connector unit as set forth in claim 1, in which said gasket means comprise plastics or rubbery sheeting.

4. A connector unit as set forth in claim 1, in which two of the plates are formed with channelled flat surfaces and channels on one of said plates cross the channels on the other plate, and a third one of said plates comprises a cover plate having bolts providing said clamping means and holding the plate stack to the flat face of the block.

5. A connector unit having parallelepiped mounting block, linear through passages formed in said block, fluid-pressure operated components mounted on one face of said block and communicating with said passages, a circuit plate, means holding said plate to a second face of said block, a flat surface formed on said circuit plate and complementary to said second face of said block, channels formed in said flat surface of said plate, linear holes formed in said block and linking said passages with said channels, and gasket sealing means clamped between the channelled surface of the plate and said second face of the block.

6. In a fluid connector unit, the combination of a mounting block having fluid-actuated components mounted thereon and provided with through passages for conveying fluid to and from said components, transverse holes extending from said passages to a side face of said block, and a circuit plate secured to said side face of the block, said circuit plate being provided with channels connecting together selected of said holes in accordance with predetermined circuitry and being replaceable by another circuit plate having a different arrangement of channels, whereby the circuitry may be changed without removing said components from the mounting block or disturbing fluid connections to said passages.

References Cited

UNITED STATES PATENTS

| | | | |
|---|---|---|---|
| 2,947,320 | 8/1960 | Oxley et al. | 251—367 X |
| 3,057,551 | 10/1962 | Etter | 251—367 X |
| 3,060,970 | 10/1962 | Aslan | 251—367 X |
| 2,834,368 | 5/1958 | Gray | 251—367 X |
| 2,871,887 | 2/1959 | Obreski et al. | 138—111 |
| 3,195,572 | 7/1965 | Carls | 137—608 |
| 3,213,883 | 10/1965 | Carls | 137—608 |

FOREIGN PATENTS

| | | |
|---|---|---|
| 1,252,448 | 12/1960 | France. |
| 1,301,683 | 7/1962 | France. |

OTHER REFERENCES

German application 1,093,625, November 1960.

HENRY T. KLINKSIEK, *Primary Examiner.*